US010191782B2

United States Patent
Grobelny et al.

(10) Patent No.: US 10,191,782 B2
(45) Date of Patent: *Jan. 29, 2019

(54) SYSTEM TO SCHEDULE AND PERFORM AUTOMATED SOFTWARE TASKS DURING UNATTENDED SYSTEM TIME USING PREDICTED KNOWLEDGE OF INDIVIDUAL USER BEHAVIOR

(71) Applicant: DELL PRODUCTS, LP, Round Rock, TX (US)

(72) Inventors: Nicholas D. Grobelny, Austin, TX (US); Abeye Teshome, Austin, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/164,455

(22) Filed: May 25, 2016

(65) Prior Publication Data

US 2016/0266942 A1  Sep. 15, 2016

Related U.S. Application Data

(63) Continuation-in-part of application No. 14/160,148, filed on Jan. 21, 2014, now Pat. No. 9,753,517.

(51) Int. Cl.
*G06F 1/32* (2006.01)
*G06F 9/50* (2006.01)
*G06F 1/26* (2006.01)

(52) U.S. Cl.
CPC ............ *G06F 9/5094* (2013.01); *G06F 1/263* (2013.01); *G06F 1/3206* (2013.01); *G06F 1/3209* (2013.01)

(58) Field of Classification Search
CPC .................................................... G06F 9/5094
See application file for complete search history.

(56) References Cited

U.S. PATENT DOCUMENTS

| 8,041,967 B2 | 10/2011 | Belady et al. |
| 8,255,090 B2 | 8/2012 | Frader-thom et al. |
| 8,655,307 B1 | 2/2014 | Walker et al. |

(Continued)

OTHER PUBLICATIONS

"Facts About Intel's Smart Connect in the Dell XPS 13," by Eric Grevstad at pcmag.com http://www.pcmag.com/article2/0,2817,2401223,00.asp. 2 pages, Mar. 6, 2012.

*Primary Examiner* — Kim Huynh
*Assistant Examiner* — Eric Chang
(74) *Attorney, Agent, or Firm* — Larson Newman, LLP

(57) ABSTRACT

In one aspect a disclosed method may include determining, by an information handling system, a future predicted system time that an unattended task is to be executed on the information handling system. The future predicted system time is based at least in part on first usage parameters for a user indicating first periods of usage activity, second periods of inactivity associated with the information handling system recorded during a first duration, and critical system parameters relevant to the present state of the information handling system. The method may also include ensuring that system resources of the information handling system are available for the unattended task to be able to complete. In response to the arrival of the future predicted system time, the unattended task is executed.

20 Claims, 3 Drawing Sheets

(56) References Cited

U.S. PATENT DOCUMENTS

| 8,849,097 B2 | 9/2014 | Klappert |
| 2008/0059275 A1* | 3/2008 | Keany .................. G06F 9/5027 718/102 |
| 2015/0205335 A1 | 7/2015 | Teshome et al. |

* cited by examiner

SYSTEM TO SCHEDULE AND PERFORM AUTOMATED SOFTWARE TASKS DURING UNATTENDED SYSTEM TIME USING PREDICTED KNOWLEDGE OF INDIVIDUAL USER BEHAVIOR

CROSS REFERENCE TO RELATED APPLICATION(S)

This application is a continuation-in-part of U.S. patent application Ser. No. 14/160,148, entitled "User-Personalized Wake Policy Based on Learned User Behavior," filed on Jan. 21, 2014, the disclosure of which is hereby expressly incorporated by reference in its entirety.

FIELD OF THE DISCLOSURE

This disclosure relates generally to information handling systems, and more particularly relates to a user-personalized task scheduling policy for information handling systems based on learned user behavior.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one aspect a disclosed method may include determining, by an information handling system, a future predicted system time that an unattended task is to be executed on the information handling system. The future predicted system time is based at least in part on first usage parameters for a user indicating first periods of usage activity, second periods of inactivity associated with the information handling system recorded during a first duration, and critical system parameters relevant to the present state of the information handling system. The method may also include ensuring that system resources of the information handling system are available for the unattended task to be able to complete. In response to the arrival of the future predicted system time, the unattended task is executed.

Other disclosed aspects include article of manufacture comprising a non-transitory computer-readable medium storing instructions executable by a processor, and the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
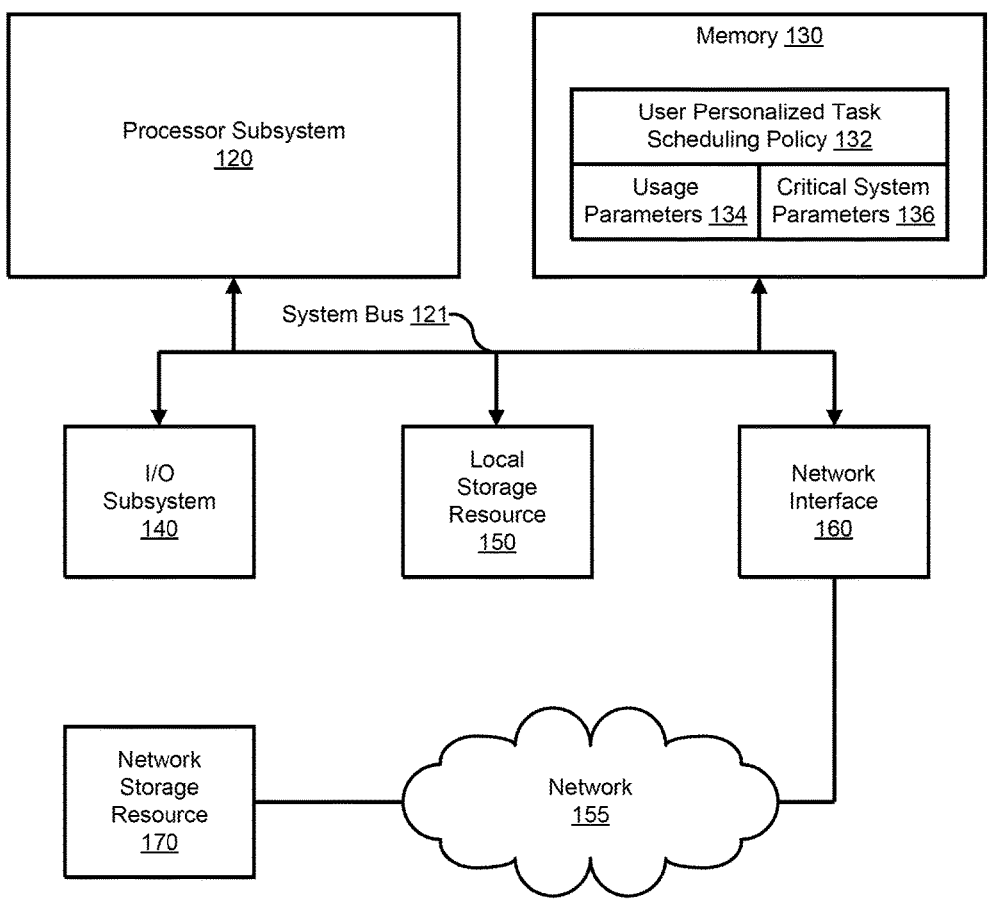
FIG. 1 is a block diagram of selected elements of an embodiment of an information handling system for implementing a user-personalized task scheduling policy based on learned user behavior.

FIG. 1 shows an information handling system 100 for implementing a user-personalized task scheduling policy based on learned user behavior. Also shown with information handling system 100 are external or remote elements, namely, network 155 and network storage resource 170. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (such as a hard disk drive or floppy disk), a sequential access storage device (such as a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Conventional methods of scheduling software and system maintenance tasks in an information handling system may provide user selectable and/or default times to run these maintenance tasks. However such conventional scheduling, which is based on fixed intervals and/or clock times and does not take in to account critical system parameters relevant to the present state of the information handling system, may not be well suited to accommodate actual usage patterns of individual users. Actual usage patterns of real life users may include daily, weekly, seasonal, and/or other periodic or irregular activities.

Components of information handing system 100 may include processor subsystem 120 which may have one or more processors, and system bus 121 that communicatively couples various system components to processor subsystem 120 including, for example, memory subsystem 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Network interface 160 may be a suitable system, apparatus, or device operable to serve as an interface between information handling system 100 and a network 155. Network interface 160 may enable information handling system 100 to communicate over network 155 using a suitable transmission protocol and/or standard, including transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, system 100 and network 155 may be included in a rack domain.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (such as in memory subsystem 130 and/or another component of physical hardware 102). In the same or alternative embodiments, processor subsystem 120 may interpret and/or execute program instructions and/or process data stored remotely (such as in a network storage resource).

Memory subsystem 130 may include a system, device, or apparatus operable to retain and/or retrieve program instructions and/or data for a period of time (such as computer-readable media). As shown in the example embodiment of FIG. 1, memory subsystem 130 stores user-personalized task scheduling policy 132, which may represent instructions executable by processor subsystem 120 to implement the methods described herein, usage parameters 134, and critical system parameters 136. In different embodiments, user-personalized task scheduling policy 132 may be stored at network storage resource 170 and may be accessed by processor subsystem 120 via network 155. Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may include computer-readable media (such as hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory subsystem 130 for execution, such as user-personalized task scheduling policy 132. In information handling system 100, I/O subsystem 140 may include a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown). As will be described in further detail, information handling system 100 may implement a user-personalized task scheduling policy based on learned user behavior.

In certain information handling systems, such as portable information handling systems, software and system maintenance tasks are run to keep these systems up to date with the latest software and firmware updates, perform security and virus scans to prevent system breaches, data loss and/or compromise, and the like. These system and software maintenance tasks are typically scheduled based on "best guess" assumptions made by software developers or information technology managers for the general population. Because user behavior is different for each user, the method based on "best guess" is "static", and is not optimal or tailored for each individual user. This method is also based on general behavioral assumptions that do not take in to account critical system parameters relevant to the present state of the system. Scheduling system and software maintenance tasks in this manner can result in these tasks running while the user is active that can be intrusive, consume valuable system resources impacting productivity, and may not be well suited for actual usage patterns that users of information handling systems experience.

Figure 2:
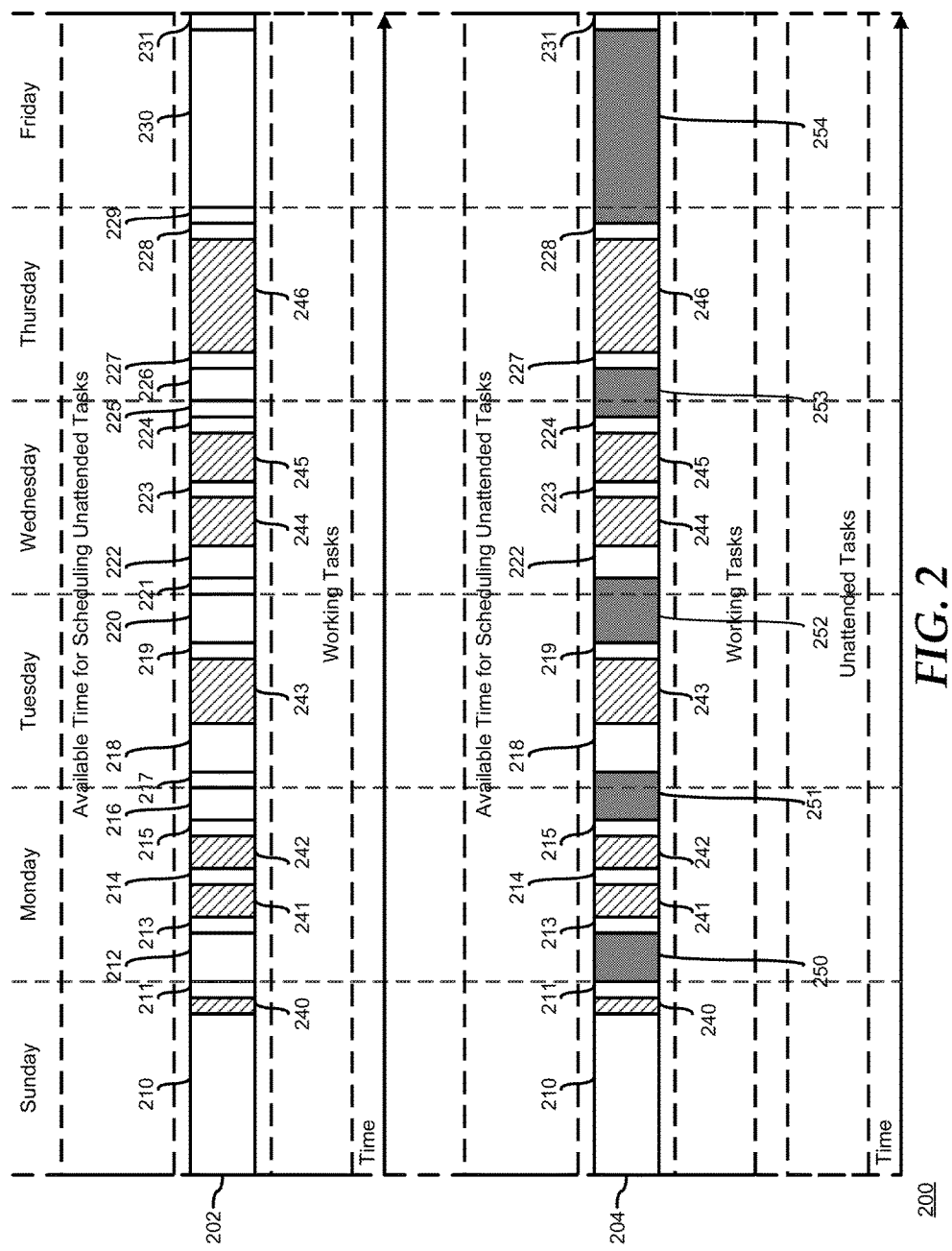
FIG. 2 is a block diagram illustrating basic representations of two possible allocations of information handling system time of a user-personalized task scheduling policy, in accordance with at least one embodiment of the present disclosure.

FIG. 2 illustrates an exemplary pair of possible allocations of system time of a user-personalized task scheduling policy 200 for an information handling system, such as information handling system 100. One of the possible allocations may be for the allocation of working tasks 202 associated with periods of user activity, also referred herein as usage activity. The other of the possible allocations may be for the allocation of working tasks and unattended tasks 204 associated with periods of user inactivity.

Unattended tasks, such as software and system management tasks and maintenance tasks, include executing programs, network activity, performing security scans, repairing file systems, running diagnostic tests, and/or other types of desired local maintenance, performing a hardware/software inventory of the information handling system, software updates, application of software patches, application of firmware updates/patches, compliance checks, and the like. The system management and/or maintenance activities may be performed by a user-personalized task scheduling policy using a network to connect to a network server over a public network (that is cloud-based services) or over a local-area network (that is local network administrator services). Network activity and local activity may be combined or performed in conjunction with one another with respect to system management and/or maintenance activities performed by the user personalized task scheduling policy. The network activity may include updating email accounts, updating social media accounts, downloading updates, scheduled network operations, and/or performing scheduled tasks from a network server (that is scanning for malicious code, updating malicious code signatures, downloading/installing software updates, etc.).

FIG. 2 shows a portion of a particular week of system time allocation, where the period of time for each day of the week is labeled Sunday, Monday, Tuesday, Wednesday, Thursday, and Friday, and time proceeds from Sunday through Friday as depicted by the arrows labeled Time. Each day has a total of 24 hours and each week has a total of 168 hours of time.

As illustrated the allocation of working tasks 202 has a total of twenty-two periods of time where the user of information handling system 100 is inactive, and are available for scheduling of unattended tasks. The twenty-two periods of time of inactivity are labeled 210-231. The allocation of working tasks 202 also has seven periods of time that working tasks are scheduled while the user is active and are labeled 240-246, where the usage activity includes forty-two hours of working time. Thus, information handling system 100 has a 25% utilization of total time available (42/168).

The allocation of working tasks and unattended tasks 204 has a total of thirteen periods of time of inactivity after user-personalized task scheduling policy 132 has scheduled the unattended tasks, where the thirteen periods of inactive time remaining are 210, 211, 213, 214, 215, 218, 219, 222-224, 227, 228, and 231. The allocation of working tasks and unattended tasks 204 also has the same seven periods of time that working tasks 240-246 are scheduled that has the forty-two hours of working time. The allocation of working tasks and unattended tasks 204 also includes five periods of time that unattended tasks 250-254 are scheduled having a total of fifty-eight hours of unattended task time. User-personalized task scheduling policy 132 schedules each unattended task based on learned user behavior, usage parameters 134, present critical system parameters 136, and available time periods of inactivity that allow each unattended task to be completed, described in further detail below. In the illustrated example, unattended task 250 is scheduled to run during available inactive time 212. Similarly, unattended tasks 251-254 are scheduled to run during available inactive times 216, 220, 225-226, and 229-230, respectively. After scheduling the unattended tasks 250-254, information handling system 100 has a 60% utilization ((42+58)/168 hours), for a 138% total improvement in system utilization.

Figure 3:
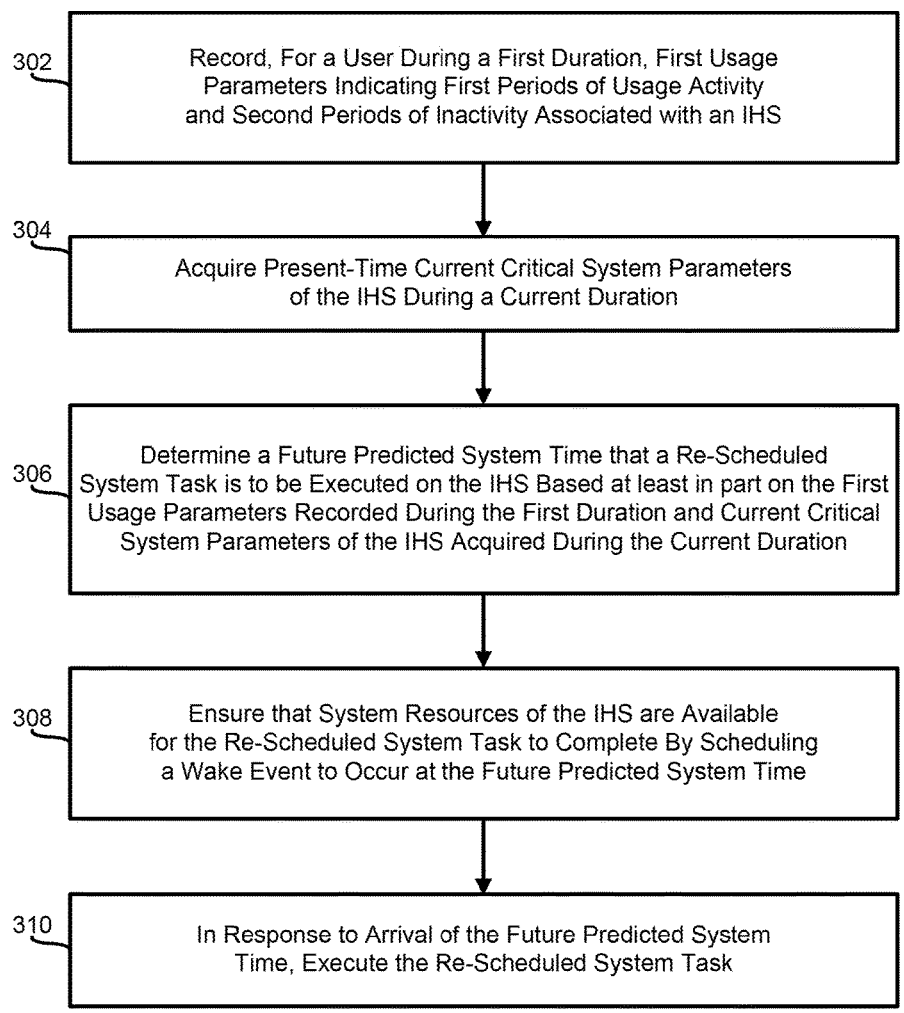
FIG. 3 is a flowchart depicting selected elements of an embodiment of a method for implementing a user-personalized task scheduling policy based on learned user behavior.

FIG. 3 shows a method 300 for implementing a user-personalized task scheduling policy based on learned user behavior. Method 200 may be performed using information handling system 100 (see FIG. 1) for example, by executing user-personalized task scheduling policy 132. Certain operations described in method 200 may be optional or may be rearranged in different embodiments.

Method 300 starts at block 302, where information handling system 100 can begin by recording, for a user during a first duration, first usage parameters indicating first periods of usage activity and second periods of inactivity associated with an information handling system (IHS), where the first periods of usage activity can be the seven periods of usage activity 240-246 and the second periods of inactivity can be the 22 periods of inactivity 210-231 of FIG. 2, described above. Information handling system 100 can store the first usage parameters at usage parameters 134 of memory 130. The first duration may represent a learning period for user-personalized task scheduling policy 132 during which the personalized preferences and behaviors of the user are learned by user-personalized task scheduling policy 132. The first periods of usage activity may represent usage sessions during which the user continuously uses information handling system 100, while the second periods of inactivity may represent dormant activity between the first periods. In certain instances, the second periods of inactivity may be associated with a dormant power state in which information handling system 100 is placed in order to preserve power. One example of a dormant power state is "sleep mode" or "standby mode", in which information handling system 100 remains booted and ready to resume operation within a short wake time. In some cases, the dormant power state is associated with disabling of certain components of information handling system 100, such as a display device, a storage device, a network adapter, among other components. When the dormant power state is a power off state, user-personalized task scheduling policy 132 may automatically start (i.e., boot) information handling system 100 in advance of a wake time.

As noted, during the first duration, user-personalized task scheduling policy 132 may monitor and record start and stop times (or other related time values, such as time periods, gaps, etc.) to learn the user's actual usage patterns of activity on information handling system 100. In certain embodiments, the first duration may last for at least three weeks, for example, when a weekly pattern for the user-personalized task scheduling policy is to be learned. In various embodiments, the first duration may be extended and/or repeated to accommodate changes in the user's actual usage patterns. As will be described in further detail, user-personalized task scheduling policy 132 may further include a month of year, in addition to day of week and time of day, to specify user-personalized wake times that include longer term variations in a user's actual usage patterns, such as monthly, quarterly, seasonally, etc.

At block 304, user-personalized task scheduling policy 132 can acquire critical system parameters of information handling system 100 at the current/present time and store them at critical system parameters 136 of memory 130. Critical system parameters 136 includes system environment conditions, hardware and software resource availability, available space of local storage resource 150, available space of network storage resource 170, network availability, network interface connectivity status, A/C power availability, battery power availability and power levels, central processing unit (CPU) availability, processor loads, temperature of information handling system 100 and its sub-components, keyboard and mouse activity, and the like.

At block 306, user-personalized task scheduling policy 132 determines a future predicted time that an unattended task is to be scheduled and executed on information handling system 100 based at least in part on the first usage parameters recorded during the first duration and current critical system parameters of information handling system 100 acquired during a current duration.

User personalized task scheduling policy 132 can determine the future predicted time by identifying continuous periods of inactivity from the second periods of inactivity of first usage parameters that would allow the unattended task to execute to completion based on the unattended task's time requirements, i.e. the length of time to execute the unattended task is less than or equal to the length of time of a continuous period of inactivity. As an example, an unattended task may be a re-scheduled system task that has been statically scheduled to run at noon on every Friday. In order to not intrude on a user's active time, the re-scheduled system task can be scheduled to be executed at the future predicted time so as not to intrude on a user's active time, where the learned user's behavior indicates that the user is active during this time period.

User personalized task scheduling policy 132 can determine the time and resource requirements from information associated with each particular unattended task. The information associated with each particular unattended task can be provided by the task itself during an initialization event, learned and recorded from past executions of the unattended tasks, pre-loaded during system initialization, and the like. User personalized task scheduling policy 132 further determines that the attended task's resource requirements can be met from information stored at critical system parameters 136. For example, a virus scan may require two hours to run to completion, a valid network connection to access the most up to date scanning software, and 20 MB of storage to download virus scan information. Information at critical system parameters 136 indicates that local storage resource 150 has 50 MB of space available, a valid network connection exists, and A/C power is available. In the exemplary embodiment of FIG. 2, user personalized task scheduling policy 132 determined that unattended task 250 would be able to execute to completion with all its resource requirements met during available time period 212, Sunday at mid-night.

At block 308, user personalized task scheduling policy 132 ensures that all of the resources of information handling system 100 are available for the unattended task to complete by scheduling a wake event to occur at the future predicted system time that the unattended task is to be executed. Wake events are also referred herein as user-personalized wake times.

At block 310, in response to the occurrence and arrival of the future predicted system time, user personalized task scheduling policy 132 executes the unattended task including waking information handling system 100 at the user personalized wake time. In this manner, method 300 may continue to learn and adapt to the user's actual usage behavior over time.

Method 300 may incorporate certain data structures that enable the user-personalized task scheduling policy to learn and adapt to changes in the user's usage patterns over different time scales. For example, for an initial time respectively associated with the first periods of usage activity, the first usage parameters may include a time of day, a day of week, and a month of year. In this manner, a daily or weekly pattern may be captured and implemented by the user-personalized task scheduling policy. The daily or weekly pattern may further be adapted to monthly variations, such as seasonal variations that result from varying sleep and/or daylight patterns, academic and summer schedules, vacations, etc. While the first duration may initially be about three weeks to learn a basic daily or weekly usage activity pattern for a user, over longer periods of time as the first usage parameters continue to be collected, longer term usage patterns for the user may be effectively and automatically captured and executed by the user-personalized task scheduling policy, as described with respect to method 300.

This disclosure describes how a user-personalized task scheduling policy based on learned user behavior may provide certain advantages over conventional methods of scheduling software and system maintenance tasks. The user-personalized task scheduling policy of the present disclosure may be adaptive to actual user activity and may account for variations in user usage patterns over the short term (for example within about daily and/or weekly cycles) as well as over the long term (such as within about monthly, quarterly, seasonal, academic, and/or other longer cycles), while also accounting for present time critical system parameters relevant to the present state of the system. In this manner, the user-personalized task scheduling policy described herein may be advantageous both in terms of minimizing or eliminating the scheduling of maintenance tasks during periods when the user is active on the information handling system, as well as ensuring that critical system parameters, such as environmental variables, temperature, of the information handling system are within range, and critical system resources, such as system disk space, or network connections are available, meet requirements to perform these maintenance tasks. This can also result in additional user benefit by performing the maintenance tasks during periods of user inactivity, thereby minimizing or eliminating the intrusiveness of these tasks, and increasing user productivity.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The second usage parameters, for the user during a second duration, may be recorded indicating actual wake times at wake events of the information handling system. The recording operation may be performed as a monitoring operation while the wake policy is being executed on the information handling system, and may be repeated, as desired. In other words, the second duration may be selected to be independent of the first duration and may be periodically repeated. The actual wake times indicated by the second usage parameters may be associated with wake events that are automatically executed by the wake policy, rather than wake events manually performed by the user, which are recorded with the first usage parameters. It is noted that when a wake policy wake event occurs, it may be understood as evidence that the wake policy was successful to the extent that the user did not manually wake the information handling system prior to that wake event. When the user manually wakes the information handling system, the wake policy may be understood to have failed for that particular wake event in learning the user's desired behavior, since the wake policy did not wake the information handling system in advance of when the user desired to begin a first period of usage activity. The wake policy may be compared to the second usage parameters to determine a frequency of wake events that result from executing of the wake policy. The frequency of wake events may be expressed at a hit ratio over a period of time, or as a relative value to a total number of wake events, including manual and automatic wake policy events. Then, a decision may be made whether the frequency of wake events is below a first threshold. The first threshold may be a quantitative measure of a desired efficacy of the wake policy, such as 90% of all wake events, for example. When the result of operation is YES, additional first usage parameters may be recorded (i.e., additional learning for the user-personalized wake policy). When the result of operation is NO, method may return to continue to learn and adapt to the user's actual usage behavior over time The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   determining, by an information handling system, a future predicted system time that an unattended task is to be executed on the information handling system, the future predicted system time based at least in part on first usage parameters for a user of the information handling system, the first usage parameters indicating first periods of usage activity and second periods of inactivity associated with the information handling system recorded during a first duration, and the first usage parameters indicating critical system parameters relevant to the present state of the information handling system;
   ensuring, by the information handling system, that system resources of the information handling system are available for the unattended task to be able to complete;
   in response to an arrival of the future predicted system time, executing, by the information handling system, the unattended task;
   incrementing, by the information handling system, a count of wake events in response to the executing of the unattended task at the arrival of the future predicted system time;
   comparing, by the information handling system, the count of the wake events to a threshold value, the threshold value based on the first periods of usage activity and the second periods of inactivity; and
   recording, by the information handling system, the future predicted system time as a wake event of the wake events in response to the count of the wake events being less than the threshold value.

2. The method of claim 1, wherein the determining of the future predicted system time further comprises:
   recording, by the information handling system, the first usage parameters for the user during the first duration.

3. The method of claim 2, wherein the first duration is at least three weeks long, and wherein the recording of the first usage parameters for the user is repeated at least monthly.

4. The method of claim 1, wherein the determining of the future predicted system time further comprises:
   acquiring, by the information handling system, the critical system parameters relevant to the present state of the information handling system during a present time.

5. The method of claim 1, further comprising scheduling the wake event to occur at the future predicted system time.

6. The method of claim 1, wherein the critical system parameters include at least one of:
   a status of a network connection of the information handling system;
   a status of alternating current power of the information handling system;
   a status of battery power of the information handling system;

a status of storage space of the information handling system;
a status of a central processing unit of the information handling system;
a temperature of the information handling system; and
a processor load of the information handling system.

7. The method of claim 1, wherein the unattended task includes at least one of:
a system management task;
a system maintenance task;
a security scan task;
a diagnostic test task;
a file system repair task;
a software update task;
a software patch application task;
a firmware update task; and
a productivity task.

8. An information handling system, comprising:
a memory device; and
a hardware processor subsystem in communication with the memory device, the hardware processor subsystem executing instructions stored by the memory device, the instructions causing the hardware processor subsystem to perform operations including:
determining a future predicted system time that an unattended task is to be executed on the information handling system, the future predicted system time based at least in part on first usage parameters for a user of the information handling system, the first usage parameters indicating first periods of usage activity, second periods of inactivity associated with the information handling system recorded during a first duration, and critical system parameters relevant to a present state of the information handling system;
scheduling a wake event at the future predicted system time to ensure that system resources of the information handling system are available for the unattended task to be able to complete;
executing the wake event at the future predicted system time in response to an arrival of the future predicted system time;
executing the unattended task in response to the wake event;
incrementing a count of wake events in response to the executing of the unattended task at the arrival of the future predicted system time;
comparing the count of the wake events to a threshold value, the threshold value based on the first periods of usage activity and the second periods of inactivity; and
recording the wake event at the future predicted system time in response to the count of the wake events being less than the threshold value.

9. The information handling system of claim 8, wherein the operations further comprise recording the first usage parameters for the user during the first duration.

10. The information handling system of claim 9, wherein the first duration is at least three weeks long, and wherein the recording of the first usage parameters for the user is repeated at least monthly.

11. The information handling system of claim 8, wherein the operations further comprise acquiring the critical system parameters relevant to the present state of the information handling system during a present time.

12. The information handling system of claim 8, wherein the operations further comprise adding the wake event to a wake policy at the future predicted system time.

13. The information handling system of claim 8, wherein the critical system parameters include at least one of:
a status of a network connection of the information handling system;
a status of alternating current power of the information handling system;
a status of battery power of the information handling system;
a status of storage space of the information handling system;
a status of a central processing unit of the information handling system;
a temperature of the information handling system; and
a processor load of the information handling system.

14. The information handling system of claim 8, wherein the unattended task includes at least one:
a system management task;
a system maintenance task;
a security scan task;
a diagnostic test task;
a file system repair task;
a software update task;
a software patch application task;
a firmware update task; and
a productivity task.

15. A method, comprising:
acquiring, by an information handling system, critical system parameters relevant to a present state of the information handling system;
determining, by the information handling system, a future predicted system time that an unattended task is to be executed on the information handling system, the future predicted system time based at least in part on first usage parameters for a user indicating first periods of usage activity, second periods of inactivity associated with the information handling system recorded during a first duration, and the critical system parameters relevant to the present state of the information handling system;
scheduling, by the information handling system, a wake event at the future predicted system time to ensure that system resources of the information handling system are available for the unattended task to be able to complete;
executing, by the information handling system, the wake event at the future predicted system time;
executing, by the information handling system, the unattended task in response to the executing of the wake event at the future predicted system time;
incrementing, by the information handling system, a count of wake events in response to the executing of the wake event at the future predicted system time;
comparing, by the information handling system, the count of the wake events to a threshold value, the threshold value based on the first periods of usage activity and the second periods of inactivity; and
recording, by the information handling system, the wake event at the future predicted system time in response to the count of the wake events being less than the threshold value.

16. The method of claim 15, wherein the determining of the future predicted system time further comprises recording the first usage parameters for the user during the first duration.

17. The method of claim 16, wherein the first duration is at least three weeks long, and wherein the recording of the first usage parameters for the user is repeated at least monthly.

18. The method of claim 15, further comprising adding the wake event to a wake policy at the future predicted system time.

19. The method of claim 15, wherein the critical system parameters include at least one of:
- a status of a network connection of the information handling system;
- a status of alternating current power of the information handling system;
- a status of battery power of the information handling system;
- a status of storage space of the information handling system;
- a status of a central processing unit of the information handling system;
- a temperature of the information handling system; and
- a processor load of the information handling system.

20. The method of claim 15, wherein the unattended task includes at least one of:
- a system management task;
- a system maintenance task;
- a security scan task;
- a diagnostic test task;
- a file system repair task;
- a software update task;
- a software patch application task;
- a firmware update task; and
- a productivity task.

* * * * *